United States Patent
Riom et al.

(10) Patent No.: US 6,177,161 B1
(45) Date of Patent: *Jan. 23, 2001

(54) GLASS-BASED SUPPORTING STRUCTURE

(75) Inventors: Pierre Riom, Chateauneuf; Marie-Helene Debrus, Dampierre en Burly, both of (FR)

(73) Assignee: Saint-Gobain Vitrage, Courbevoie (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/761,142

(22) Filed: Dec. 6, 1996

(30) Foreign Application Priority Data

Dec. 6, 1995 (FR) .................................................. 95 14437

(51) Int. Cl.$^7$ .................................................. B29D 22/00
(52) U.S. Cl. ....................... 428/36.9; 428/34.4; 428/34.5; 428/46; 428/48; 428/49; 428/51; 428/174; 428/192; 428/411.1; 428/412; 428/414; 428/415; 428/417; 428/913

(58) Field of Search ................... 428/46, 48, 51, 428/428, 913, 49, 423.3, 425.6, 34.4, 34.5, 412, 414, 415, 417, 411.1, 174, 201, 36.9; 156/106, 107, 245, 298; 65/114

(56) References Cited

U.S. PATENT DOCUMENTS

| | | | | |
|---|---|---|---|---|
| 4,774,143 | * | 9/1988 | Gondela et al. | 428/442 |
| 4,925,511 | * | 5/1990 | Ikeda et al. | 156/106 |
| 5,019,443 | * | 5/1991 | Hall | 428/2.5 |
| 5,556,673 | * | 9/1996 | Giraud | 428/34.4 |

* cited by examiner

*Primary Examiner*—Deborah Jones
*Assistant Examiner*—Abraham Bahta
(74) *Attorney, Agent, or Firm*—Oblon, Spivak, McClelland, Maier & Neustadt, P.C.

(57) ABSTRACT

A substantially solid glass-based simplified supporting structure includes at least one supporting unit made up of at least two glass sheets separated by at least one sheet of organic material. At least one protective member is provided on a face of the supporting unit, this protective member being made up of at least one sheet or layer of inorganic material and/or at least one sheet or layer of organic material.

16 Claims, No Drawings

GLASS-BASED SUPPORTING STRUCTURE

BACKGROUND OF THE INVENTION

1. Field of the Invention

The present invention relates to a supporting structure, especially a structure of the pole or post type, which is glass-based and exhibits the mechanical properties required for its use. The present invention also relates to the architectural assemblies produced from such structures.

2. Description of the Related Art

The use of (inorganic) glass to replace more traditional materials such as metals, concrete, timber and the like in the production of elongated supporting structures of the column, pole, beam and similar types, for aesthetic reasons in particular, is known, per se. The glass employed in such structures can take various forms, especially the form of continuous threads, beads, plates or tubes. While the structures thus produced have desirable transparency properties, it is essential that they also exhibit sufficient mechanical strength and safety characteristics.

Supporting structures meeting these criteria are described, for example, in Patent Application WO 93/01372. This application proposes structural members made up of the association of three categories of members: glass members of the rod, tube, plate, bead type and the like, transparent fibers such as glass fibers, and transparent resins. These structures make it possible to obtain a good compromise between transparency and the mechanical properties which are sought. However, their production requires a number of lengthy steps and the use of a number of glass or organic products which sometimes are high in cost (glass tubes, plates obtained from glass fabrics, costly resin and the like). Such structures are also relatively complex and expensive.

Hollow supporting structures based on glass plates and/or transparent organic materials are also known, but these structures are generally complex and not easy to produce.

DESCRIPTION OF THE INVENTION

It is an object of the present invention to provide a relatively simple, predominantly transparent supporting structure exhibiting satisfactory mechanical properties.

It is a further object of the present invention to provide an architectural assembly made from one or more of the supporting structures.

The supporting structure according to the invention is for the most part solid and includes at least one supporting unit made up of at least two glass sheets separated by at least one sheet of organic material. It also includes at least one protective member on a face of the supporting unit, this protective member being made up of at least one sheet or layer of inorganic material and/or of at least one sheet or layer of organic material.

"For the most part solid" is intended to mean that the components of the supporting structure define a volume of which at least 50%, and preferably at least 75%, is occupied by the material.

In its simplest form, the supporting structure according to the invention is a laminate made up of the supporting unit and the protective member. The supporting unit must have sufficient mechanical strength for the supporting structure to be capable of being suitable for the application which is envisaged. This supporting unit must, in particular, withstand high shear forces and impacts. It must also meet the existing standards for the envisaged applications (height above ground, safety, insulation and the like). In the laminated structure forming the supporting unit, the glass sheets are preferably chosen from glass sheets which have undergone a treatment intended to endow them with increased mechanical strength. This treatment is preferably chemical toughening or tempering, especially in the case of glass sheets not exceeding 2–3 meters in length. However, the glass sheets may also be strengthened by thermal (rather than chemical) toughening or may simply have undergone annealing.

The protective member acts chiefly as protection for the supporting unit. This protection may be protection against impacts, vandalism, corrosion and the like. In the case where the glass sheets of the supporting unit are chemically toughened, the protective member prevents, for example, the surface fissuring of the supporting unit which could result in a decrease in the mechanical strength of the glass.

Each face of the supporting unit may be provided with a protective member. Each protective member may consist simply of a glass sheet mounted onto the supporting unit by means of at least one sheet of organic material. This glass sheet may be annealed but is preferably chemically or possibly heat toughened.

The protective member may also consist of a sheet of transparent (or optionally translucent) organic material fitted generally by adhesive bonding to the supporting unit, it being possible for this bonding to be produced directly, by means of an adhesive, or optionally by means of another sheet of organic material. The protective member may also consist of a thin protective layer exhibiting, in particular, anti-corrosion properties and, possibly, dirt-resistant and/or non-misting properties and the like, or may be coated with a layer which is external to the supporting structure.

The glass sheets employed for producing the supporting unit and, optionally, the protective member are generally sheets of silica-soda-lime glass of the type which are usually employed for producing laminated glasses. The glass of which the sheets consist may be colored with coloring agents which are present as impurities or which are added deliberately to its composition. It may instead include a limited amount of coloring agents (for example less than 200 ppm by weight of iron oxides and less than 100 ppm of the other oxides able to color the glass). The thickness of the glass sheets employed is generally between 3 and 20 mm.

The sheets of organic material employed for joining the glass sheets to one another may be chosen from the sheets of organic material which are usually employed for producing laminated glasses. They may consist in particular of sheets of polyvinylbutyral (PVB), polyurethane (PU) and the like. When the protective member consists of a sheet of transparent organic material, this sheet may be, for example, a sheet of polycarbonate, PU, acrylic or methacrylic material and the like.

The glass sheets of the supporting structure may have identical or different compositions, as can the sheets of organic material which are employed.

Besides the supporting unit and the protective member, the supporting structure may include on at least one of its edges a peripheral protection over the whole or a portion of the length of the edge, it being possible for this protection to consist of a sheet or an elongate member of regular geometrical or other cross-section and, for example, adhesively bonded to the edge directly or by means of an adhesive or of an organic interlayer. This protection may be made, for example, of polycarbonate, PU, acrylic or methacrylic material, glass, metal (stainless steel, aluminum, etc.), wood and the like. In the case of supporting structures of the pole type, the side edges in the lower portion (after installation) of the structures are preferably provided with peripheral protection.

The supporting structure may also include one or a number of conductive members such as electrical wires, braids, tinsel, cables, connectors and the like, especially when the structure is intended to be employed for signaling or lighting purposes. These conductive members may be, for example, embedded in one of the sheets of organic material of the supporting structure, especially of the supporting unit, and/or may be applied to at least one of the edges of at least one of the components of the supporting structure, this component being optionally of smaller dimensions than the other components, to be set back in relation to the edge of the supporting structure and to permit the passage of the conductive members within the supporting structure.

The supporting structure may also include one or more layers of one or more enamels on at least one face of one of the glass sheets, it being possible for these enamels to be conductive enamels (based on silver in particular) or to be employed for essentially decorative purposes.

The glass sheets of the supporting structure may also have received other deposits, for example of semiconductive metal oxides, in order to impart certain luminous or energetic properties to the supporting structure.

When the supporting structure is intended for the luminous display of information, at least one of the sheets of transparent material (preferably a glass sheet) of the supporting structure may have at least one face which is locally light diffusing. The diffusing regions correspond to where the information is to be displayed and are obtained, for example, by controlled matting such as sanding or etching with acid. In this case the sheet in question is also equipped with means of illumination on at least one of its edges.

At one of its ends (especially its base in an upright position in the case of a supporting structure of the pole type), the supporting structure may also include a support or socket or seating member, for example one made of metal, the edges of this support preferably clamping the supporting unit and the protective members over a certain height, this support ensuring that the supporting structure is held in a specified position. For example, in the case of a pole, the support may be partially driven into the ground and the base of the assembly formed by the supporting unit and by the protective member may be set into the hollow portion of this support emerging from the ground. A seal or an interlayer made of organic material may optionally be inserted between the support and the assembly made up of the supporting unit and the protective member.

In a non-limiting example, the supporting structure is a support for an advertising sign and, once installed, takes the form of a laminate 2.8 m in height, 50 cm in width and 53 mm in thickness, this laminate being made up of five sheets of chemically toughened glass bonded by PVB sheets, each of the three middle sheets having a thickness of 12 mm and being joined to one another by a PVB sheet of 2.5 mm thickness, the unit thus formed representing the supporting unit of the supporting structure and each of the outer glass sheets of the supporting structure (each of these sheets forming a protective member of the supporting structure) being 4 mm in thickness and being joined to one of the faces of the supporting unit by means of a PVB sheet of 2 mm thickness.

Seven metal braids 7 mm in width by 0.35 mm in thickness are distributed in at least one or optionally both PVB interlayer sheets of 2.5 mm thickness, it being possible for some of these braids or for additional braids to be also placed on one or on both side edges of the middle sheet. The glass employed for producing the glass sheets is an "extra white" glass containing lean than 200 ppm of iron oxides and less than 100 ppm of the other oxides capable of coloring the glass. Besides functioning as electrical supply, the metal braids embedded in the PVB allow the depth of the supporting structure to be seen.

Each of the two side edges of the supporting structure is protected over a height of 1 m starting at the base of the structure emerging from the ground, for example with a stainless steel plate. The laminate is furthermore inserted into, and held by clamping in, a seating member made of stainless steel, the walls of which protrude 20 cm above the ground (a shock-absorbing material and a finishing seal being inserted between the glass and the metal). The whole is secured to the ground by pegs.

Such a supporting structure is capable of withstanding the pressure, at mid-height, of a ladder carrying a load of 100 kg and can support a load of at least 500 kg.

The supporting structures according to the invention are intended in particular to form columns, pillars, poles or posts, pylons, beams and the like, and can reach several meters in height. These structures are generally straight but can also be curved, the glass sheets employed then being preferably chemically toughened.

The laminated structures of which the supporting structures according to the invention consist are generally produced by assembling glass sheets and sheets of organic material with heating and under pressure, the glass sheets having previously undergone a chemical or heat toughening, depending on their length and/or their thickness, or optionally annealing.

Architectural assemblies can be produced from the supporting structures according to the invention, these assemblies including one or more supporting structures according to the invention. In the case where the assembly includes a number of supporting structures, the supporting structures are, for example, adhesively bonded or welded to one another, it being possible for the assembly obtained to have a greater length and/or to take various forms, in particular to have a cross-section in the form of a T, a V (assembly of at least two supporting structures), an H, an X or a U (assembly of at least three supporting structures) and so on. The adhesive bonding of the supporting structures to each other, especially when produced on at least one of the edges of the structures, is preferably performed with the aid of an adhesive which is compatible with the organic material employed for producing the structures, preferably an adhesive identical with the material.

The supporting structures according to the invention may be used to support various loads (signs, overhead lines, branches, caissons, constructions and the like), it being possible for these loads to be placed at one end of the structures employed or to be placed in cantilever or overhanging fashion in relation to the structures. The loads are generally secured to the supporting structures by means of components such as clamping collars or supporting frameworks (trays and the like). In the example described above of an advertising sign, the supporting structure supports, for example, an elliptical caisson 3 m in width and with a mass of the order of 500 kg, this caisson bearing especially on a tray secured at the free end of the supporting structure. Where appropriate, the architectural assemblies include the abovementioned loads and the additional components for securing the loads to the supporting structures. The architectural assembly according to the invention may also consist of only one or a number of the supporting structures, e.g., simple display panels.

The supporting structures or the architectural assemblies according to the invention can be employed in all kinds of applications and in particular can be employed as supports for overhead electrical lines (the structure according to the invention advantageously forms a support which is insulating per se in this case) or overhead telephone lines, as lighting elements, sign and display posts, as traffic lights and the like.

Obviously, numerous modifications and variations of the present invention are possible in light of the above teachings. It is therefore to be understood that the invention may be practiced otherwise than as specifically described herein.

What is claimed is:

1. A supporting structure selected from the group consisting of a column, pillar, pole, post, pylon, beam, support for signs, support for lights, support for overhead lines, support for display, support for branches, support for caisson, support for construction, arch, cantilever post, cantilever pole, cantilever support for signs, cantilever support for lights, cantilever support for overhead lines, cantilever support for display, cantilever support for branches, cantilever support for lights, cantilever support for caisson, cantilever support for construction, curved column, curved pillar, curved pole, curved post, curved beam, architectural assembly, and a cantilever beam, the supporting structure comprising:

at least one supporting unit comprising at least a laminate comprising two glass sheets separated by at least one sheet of organic material;

at least one protective member on a face of the supporting unit, said at least one protective member comprising at least one sheet or layer of inorganic or organic material.

2. The supporting structure according to claim 1, wherein said glass sheets are toughened chemically.

3. The supporting structure according to claim 1, including at least one conductive member within the supporting structure.

4. The supporting structure according to claim 1 including at least one seating member.

5. Supporting structure according to claim 1 wherein said glass sheets are made of glass containing less than 200 ppm of iron oxides.

6. Supporting structure according to claim 1 wherein the supporting unit and the at least one protective member form a laminate.

7. An architectural assembly comprising at least one supporting structure selected from the group consisting of a column, pillar, pole, post, pylon, beam, support for signs, support for lights, support for overhead lines, support for display, support for branches, support for caisson, support for construction arch, cantilever post, cantilever pole, cantilever support for signs, cantilever support for lights, cantilever support for overhead lines, cantilever support for display, cantilever support for branches, cantilever support for lights, cantilever support for caisson, cantilever support for construction, curved column, curved pillar, curved pole, curved post, curved beam, architectural assembly, and a cantilever beam, the supporting structure comprising:

a supporting unit comprising at least a laminate comprising two glass sheets separated by at least one sheet of organic material;

at least one protective member on a face of the supporting unit, said at least one protective member comprising at least one sheet or layer of inorganic or organic material.

8. Assembly according to claim 7, further comprising at least one load.

9. The supporting structure according to claim 1, wherein the supporting structure is a pole or post.

10. Assembly according to claim 7, wherein the supporting structure is a pole or post.

11. The supporting structure according to claim 1, wherein the glass sheets are formed of a silica-soda-lime glass.

12. Assembly according to claim 8, wherein the glass sheets are formed of a silica-soda-lime glass.

13. The supporting structure according to claim 11, wherein the organic material of the supporting unit comprises one from the group of polyvinylbutyral and polyurethane.

14. The supporting structure according to claim 13, wherein the organic material of the protective member comprises one from the group of polycarbonate, polyurethane, acrylic and a methacrylic material.

15. Assembly according to claim 12, wherein the organic material of the supporting unit comprises one from the group of polyvinylgutyral and polyurethane.

16. Assembly according to claim 15, wherein the organic material of the protective member comprises one from the group of polycarbonate, polyurethane, acrylic and a methacrylic material.

* * * * *

UNITED STATES PATENT AND TRADEMARK OFFICE
CERTIFICATE OF CORRECTION

PATENT NO. : 6,177,161 B1  
DATED : January 23, 2001  
INVENTOR(S) : Pierre Riom et al.

Page 1 of 1

It is certified that error appears in the above-identified patent and that said Letters Patent is hereby corrected as shown below:

<u>Column 6,</u>  
Line 42, change "polyvinylgutyral" to -- polyvinylbutyral --.

Signed and Sealed this

Fifth Day of February, 2002

*Attest:*

JAMES E. ROGAN  
*Attesting Officer*    *Director of the United States Patent and Trademark Office*